F. H. MATTES.
FRUIT JAR ATTACHMENT.
APPLICATION FILED NOV. 22, 1911.
1,037,649.
Patented Sept. 3, 1912.
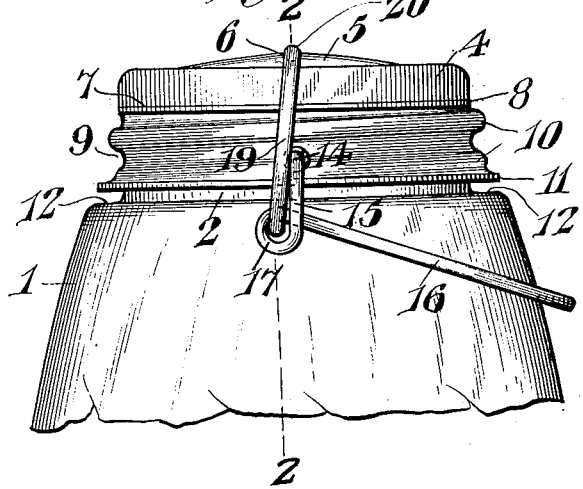
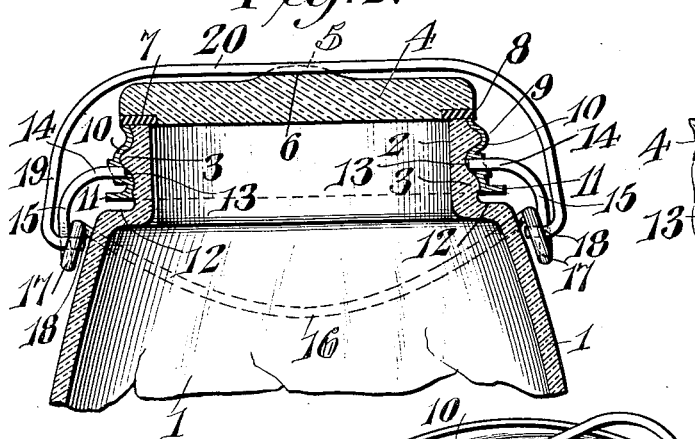
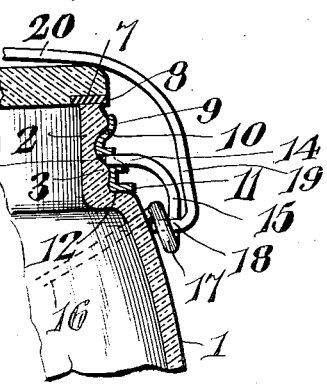
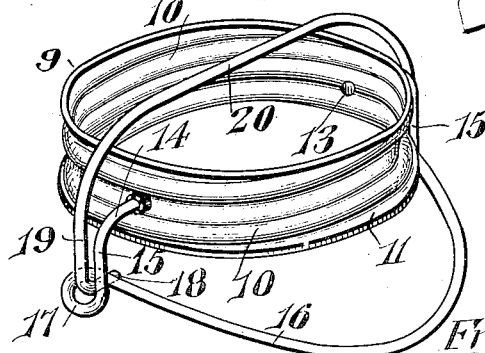
Witnesses
Jas. F. McCathran
F. T. Chapman
Inventor
Francis H. Mattes
By E. G. Siggers
Attorney

UNITED STATES PATENT OFFICE.

FRANCIS H. MATTES, OF NEWTON FALLS, OHIO.

FRUIT-JAR ATTACHMENT.

1,037,649.  Specification of Letters Patent.  Patented Sept. 3, 1912.

Application filed November 22, 1911. Serial No. 661,742.

*To all whom it may concern:*

Be it known that I, FRANCIS H. MATTES, a citizen of the United States, residing at Newton Falls, in the county of Trumbull and State of Ohio, have invented a new and useful Fruit-Jar Attachment, of which the following is a specification.

This invention has reference to improvements in attachments for fruit jars, and its object is to provide means whereby a fruit jar closure of the "Sure Seal" type may be applied to an ordinary Mason type of fruit jar.

Practically all fruit jars upon the market wherein there is provided a screw cap are of the type known as Mason jars, and between seasons the caps are frequently lost or become so damaged by use that they cannot be again employed, while the body of the jar is still in good condition. It is the experience of those dealing in fruit jars that there is a large demand for new caps.

Since the Mason fruit jar has become the staple fruit jar on the market, there has been introduced another type of fruit jar wherein there is provided a cap more readily applied and removed than the screw cap of the Mason jar, and such jars are sold under the trade names of "Sure Seal" and "E Z Seal". These newer types of fruit jars have certain advantages over the older Mason type and also sell at a higher price.

By the present invention a Mason fruit jar is readily converted into the more desirable type of fruit jar at a cost about that of replacing the cap portions of the Mason jars, and to this end there is provided a screw ring having attached thereto a clamp member usually made of wire and so constructed as to operate as a cam clamping a separate cover member against the mouth end of the neck of the jar, the cover member having means for the application of a rubber sealing gasket. By these means the Mason jar is converted into a Sure Seal jar. Furthermore, the clamping devices of the Sure Seal jar are liable to stretch in use and fail to work properly. By the present invention the effect of such stretching is overcome by suitably proportioning the screw ring, so that it may be screwed to a greater or less extent along the neck of the jar, thus compensating for the stretching of the parts, so that the life of the device is greatly prolonged.

The invention will be best understood from a consideration of the following detailed description taken in connection with the accompanying drawings forming a part of this specification, with the understanding that while the drawings illustrate a practical form of the invention the latter is by no means limited to an exact conformity with the showing of the drawings for the structure therein shown may be variously changed or modified without material departure from the salient features of the invention.

In the drawings:—Figure 1 is an elevation of a portion of a fruit jar with the invention applied thereto. Fig. 2 is a section on the line 2—2 of Fig. 1. Fig. 3 is a similar section less extensive than that of Fig. 2 and showing a somewhat different position of the parts. Fig. 4 is a perspective view of the attachment constituting the subject-matter of the present invention.

Referring to the drawings there is shown a jar 1 provided with a neck 2 having external ridges in the form of screw threads 3, the jar being what is commercially known as a Mason jar, of which there are numerous varieties, but all of the same general type. There is also shown in the drawings a cap member 4 provided with a median elongated boss 5 with a central depression 6, the said cap being such as is usually employed in connection with the type of fruit jar known as the Sure Seal or E Z Seal. The cover or cap member 4 is provided with a marginal groove 7 in which there is lodged a sealing gasket 8 when the device is in use, such sealing gasket being usually in the form of a flat rubber ring. Adapted to the outer threaded surface of the neck 2 there is a ring 9 which may be made of sheet metal pressed with screw threads 10 and at one end a circumferential flange 11 serving to stiffen the ring, and in practice the axial length of the ring is less than the length of the neck 2 so that when the flange 11 is brought into engagement with the usual shoulder on the body 1 at the junction of the neck 2 with said body, such shoulder being indicated at 12, the other end of the ring will be spaced some distance from the mouth end of the neck 2 as indicated in Fig. 3, while when one end of the ring is approximately flush with the mouth end of neck 2 the flange 11 will be spaced a corresponding distance from the shoulder 12, as indicated in Figs. 1 and 2.

At diametrically opposite sides the ring 9 is perforated, as indicated at 13, for the reception of opposite inturned ends 14 of legs 15 formed on the two ends of a bent manipulating member 16 of approximately U-shape and usually made of wire. Where the main body of the manipulating member 16 joins the legs 15 there are formed loops 17 constituting eyes for the reception of inturned toes 18 on the ends of lugs 19 of another U-shape member 20, the yoke of which latter may be sufficiently long so that the U-shaped member 20 will straddle the cap member 4 and neck 2 with the toes 18 extending through the eyes 17. The U-shaped manipulating member 16 has the legs 15 arranged at approximately right angles thereto, so that when the manipulating member 16 is turned with the inturned members 14 as an axis the eyes 17 will cause the U-shaped member 20 to move toward or from the ring 9 in accordance with the direction of movement of the manipulating member 16, the member 20 thereby becoming a clamp member for the cover or cap 4, and the manipulating member operating as a cam member which when the eyes 17 are moved past dead center the parts will be locked in position with the cap member 4 forced tightly against the neck 2 with the gasket 8 intervening. The two members 16 and 20 are usually made of wire of suitable gage and in general are similar to the like parts of Sure Seal or E Z Seal type of fruit jar closures.

The rig 9 with the clamping members 16 and 20 and the cover or cap 4 may be manufactured and sold at about the same price as the screw caps of the ordinary Mason jars, the screw ring 9 and members 16 and 20 being made of metal and the cap member 4 being made of glass or porcelain.

In the type of jars commercially known as the Sure Seal or E Z Seal the clamping device is attached permanently to the jar and the cover is the only part not so attached, so that when the parts become worn the whole jar is rendered useless. Moreover, the clamping parts become worn in use so that with those attached permanently to the jar the looseness due to wear can only be counteracted by the use of one or more thin gaskets or the use of heavier gaskets than before. With the present invention the screw ring 9 being of less axial length than that of the neck 2 is screwed on to the neck to the requisite extent to cause the clamping devices to work and as the parts become worn the ring 9 may be screwed to a greater extent upon the neck thus compensating for such wear and giving equal service to an entirely new device.

What is claimed is:—

1. An attachment for fruit jars having necks with external screw threads, comprising a screw ring, and clamping members carried thereby adapted to engage and hold a cap or cover to the neck of the jar, the screw ring being of less axial length than the length of the neck of the jar where screw threaded.

2. An attachment for fruit jars provided with externally threaded necks, comprising a screw threaded ring having a marginal flange and adapted to the threaded neck of the jar and also provided with diametrically opposite perforations, the ring being of less axial length than that of the neck of the jar where threaded, a manipulating cam member having legs at an angle to its body portion and journaled in the perforations in the ring, the legs of the cam member being joined to the body thereof by loops, and a clamp member having inturned portions engaging in the loops of the cam member, the said clamp member engaging a jar cap or closure to clamp it against the end of the neck of the jar when the cam member is moved toward the body of the jar.

In testimony, that I claim the foregoing as my own, I have hereto affixed my signature in the presence of two witnesses.

FRANCIS H. MATTES.

Witnesses:
ROSE MATTES,
C. A. NEIDHART.